Oct. 17, 1967 B. P. OCHSNER 3,348,210

DIGITAL COMPUTER EMPLOYING PLURAL PROCESSORS

Filed Dec. 7, 1964 4 Sheets-Sheet 1

INVENTOR
B. P. OCHSNER
BY Lucian C. Canepa
ATTORNEY

DIGITAL COMPUTER EMPLOYING PLURAL PROCESSORS

Filed Dec. 7, 1964 4 Sheets-Sheet 2

Oct. 17, 1967 B. P. OCHSNER 3,348,210
DIGITAL COMPUTER EMPLOYING PLURAL PROCESSORS
Filed Dec. 7, 1964 4 Sheets-Sheet 4
FIG. 4A
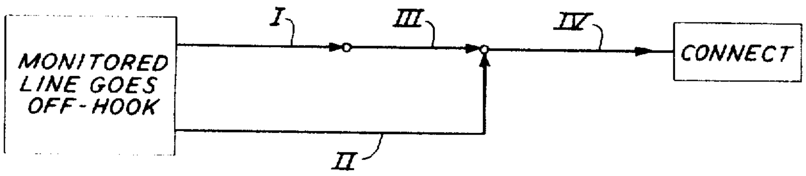
FIG. 4B
| TASK | OPERATION |
|---|---|
| I | DETERMINE CONNECTION PATH BETWEEN CALLING PARTY AND SELECTED ORIGINATING REGISTER |
| II | DETERMINE IF PAY OR NON-PAY STATION ORIGINATED CALL |
| III | ASCERTAIN THE CALLED PARTY |
| IV | DETERMINE CONNECTION PATH BETWEEN CALLING AND CALLED PARTIES |
FIG. 5
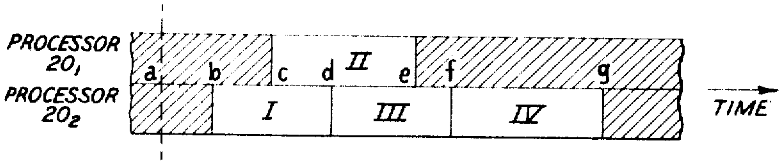

United States Patent Office 3,348,210
Patented Oct. 17, 1967

3,348,210

DIGITAL COMPUTER EMPLOYING PLURAL PROCESSORS

Brandt P. Ochsner, Mendham, N.J., assignor to Bell Telephone Laboratories, Incorporated, New York, N.Y., a corporation of New York Filed Dec. 7, 1964, Ser. No. 416,502
17 Claims. (Cl. 340—172.5)

ABSTRACT OF THE DISCLOSURE

Individual modules of a permanent memory storing functional routines and a temporary memory storing data and task assignment words are accessible to a plurality of substantially identical data processors for independent parallel processing of data on a task-by-task basis.

This invention relates to digital computers and, more specifically, to a computing arrangement which employs a plurality of independently operative data processing units.

Digital computers have been widely employed in both non-real time applications, e.g., scientific calculations and conventional computation center operations, and on a real time basis to control an associated environment, e.g., in machine tool controlling computer embodiments. Typically, such computers employ a digital memory and a data processing unit which sequentially operates on data stored in the memory in a manner determined by instructions also stored therein.

However, in such organizations, the upper bound on computing speed, i.e., the rate at which instructions may be executed, is limited by the operational capability of the processor. In addition, where a plurality of independent programs are to be successively run, a relatively large percentage of the computing time is taken by computer-controlling master, or executive programs which are not directed to performing the computations of interest.

It is therefore an object of the present invention to provide an improved digital computing arrangement.

More specifically, an object of the present invention is the provision of a digital computer which may advantageously process data at any desired rate of speed.

It is another object of the present invention to provide a digital computer which is highly flexible and wherein a relatively small amount of time is taken up by system controlling operations.

These and other objects of the present invention are realized in a specific illustrative real time digital computer employing a plurality of like data processing units. The composite computer further includes permanent and temporary information memories each comprising a plurality of storage modules accessible to each data processor.

The temporary memory has a data storage area and a plurality of task assignment locations each of which includes digits identifying a storage block in each of the two computer memories, and also conditional enabling bits. The permanent memory, in turn, includes a plurality of stored functional program routines including task assignment and task list modification algorithms.

Each of the processors independently operates on data specified by an associated task word in accordance with a routine also identified by the stored task word. Upon completion of the assigned algorithm, each processor transfers control thereof to the task assignment routine to select the highest priority, fully enabled task storage location indicative of the next task to be executed.

It is thus a feature of the present invention that a digital computer include a plurality of like data processors and a digital storage embodiment accessible to each of the processors.

It is another feature of the present invention that a digital computer include a first memory for storing a plurality of functional routines, a second memory for storing digital data words and task assignment digital words, with the task assignment words including a data word address portion and a functional routine address portion, a plurality of data processors, and circuitry for enabling each of the processors in accordance with a different one of the task assignment words for operating on the digital data identified by the task word in the manner determined by the routine specified by the task word.

A complete understanding of the present invention and of the above and other features, advantages and variations thereof may be gained from a consideration of the following detailed description of an illustrative embodiment thereof presented hereinbelow in conjunction with the accompanying drawing, in which.

Figure 1:
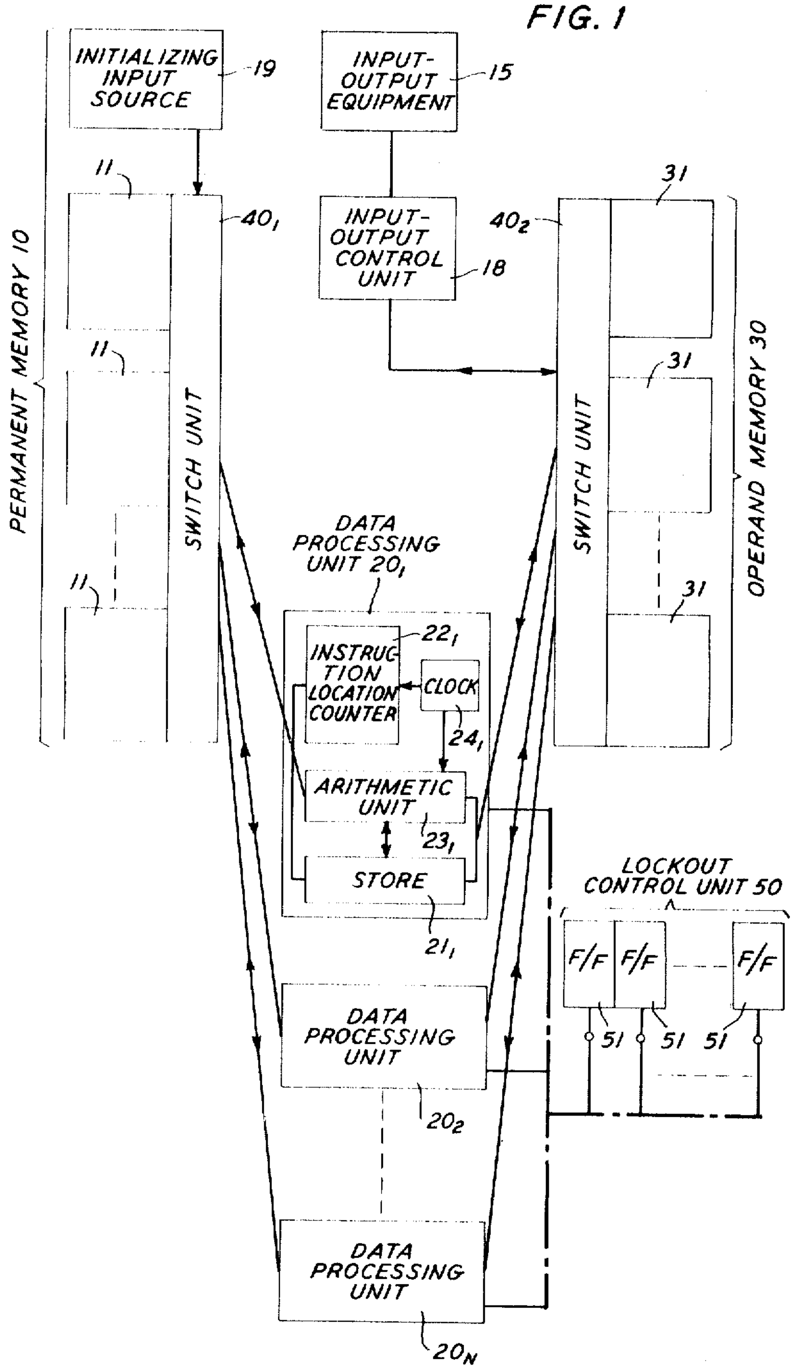
FIG. 1 is a block diagram of a specific, illustrative digital computing arrangement which embodies the principles of the present invention.

FIGS. 4A and 4B respectively comprise a sequencing diagram and a legend therefor which depict an illustrative series of operations to be executed by the FIG. 1 computing arrangement; and FIG. 5 is a timing diagram illustrating the system functioning of selected computer elements shown in FIG. 1.

Referring now to FIG. 1, there is shown a specific illustrative real time digital computing arrangement employing a permanent digital memory 10 and a temporary operand memory 30 which are respectively subdivided into a plurality of storage modules 11 and 31. Two switch units 40 are included in the composite computing arrangement to provide an interface between the storage modules 11 and 31 and N identical data processing units $20_1$ through $20_N$ for translating digital information therebetween. Each processor 20, in turn, includes a digital storage portion 21 characterized by a relatively limited information capacity, an instruction location counter 22, and arithmetic computation unit 23, and a nonsynchronized internal clock 24. Accordingly, each of the processors 20 is a fully operative computing unit capable of operating on stored data in a manner specified by stored binary instructions.

Binary information is translated between input-output equipment 15 and the operand memory 30 on a dynamic, real time basis via the switch unit $40_2$ and an input-output control unit 18. Correspondingly, the permanent memory 10 is set to a fixed digital storage pattern by an initializing input source 19 which acts through the switch unit $40_1$.

Finally, a lock-out control unit 50, including a plurality of lock-out flip-flops 51, is included in the composite FIG. 1 computer to inhibit more than one processor 20 from gaining access to selected critical storage locations in the operand store 30. More specifically, each processor 20 seeking to interrogate a critical operand storage location is constrained by internal program control to first examine the state of a particular flip-flop 51 uniquely associated with that memory location. If the flip-flop 51 resides in a first, or unblocked state, the processor 20 sets the flip-flop to a blocked state and, concurrently therewith, interrogates the desired storage address. All other processors 20 are inhibited by the set flip-flop 51 from also gaining access to the stored digital information. At some later time, the first processor 20 is operative to reset the previously blocked flip-flop 51, hence again rendering the stored information available upon request to each of the remaining processors 20.

It is noted at this point that each of the above-described FIG. 1 circuit members is well known and described, for example, in a text entitled "Handbook of Automation Computation and Control," vol. 2, edited by E. M. Grabbe, and copyrighted by John Wiley and Sons, Inc. in 1959.

Figure 2:
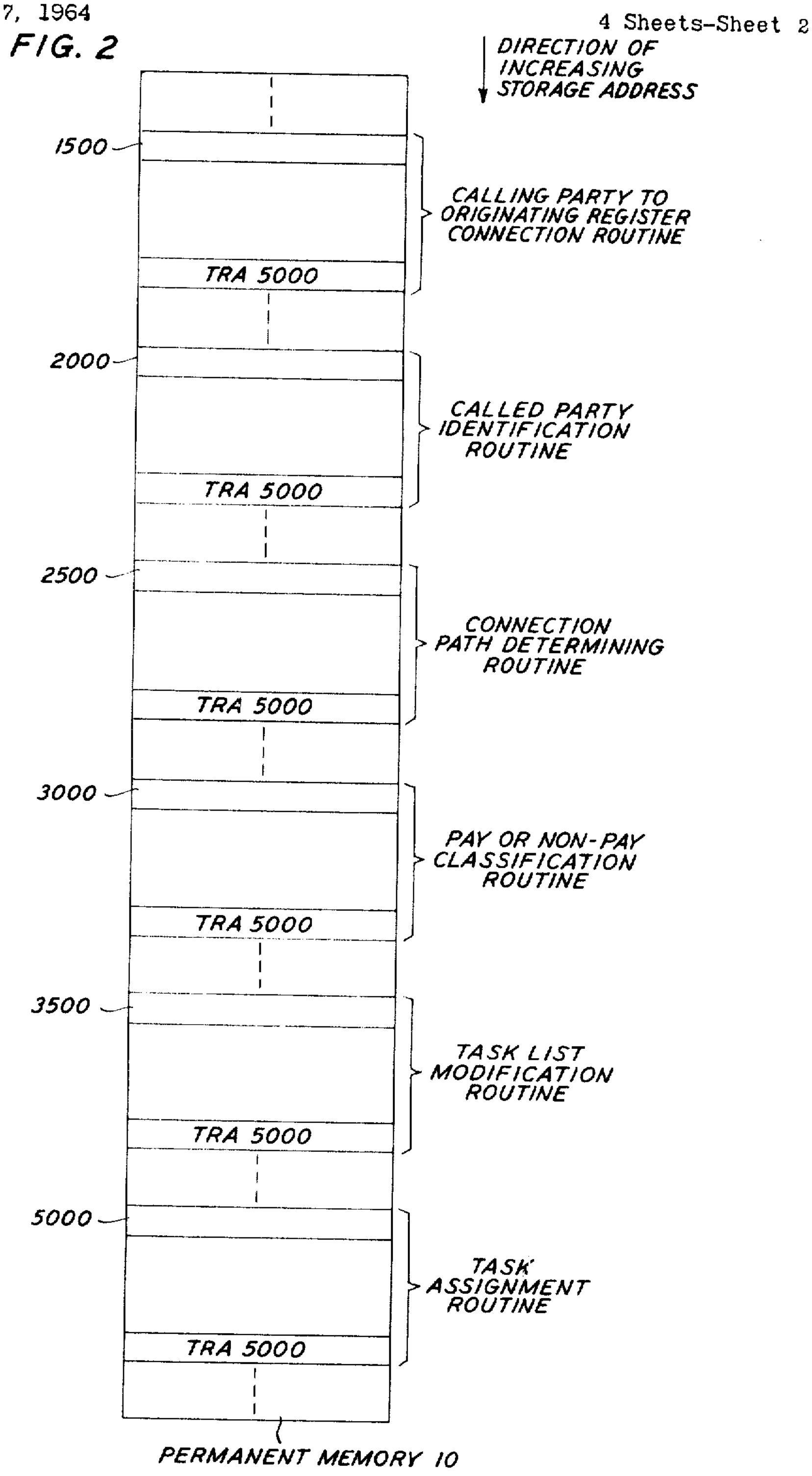
FIG. 2 is a diagram depicting the storage pattern characterizing a permanent memory 10 included in FIG. 1.

Responsive to input signals supplied thereto by the initializing source 19 and switch unit $40_1$, the permanent memory 10 has stored therein a plurality of executable program routines relating to various aspects of an environment to be controlled by the composite FIG. 1 real time digital computer. Assuming for purposes of concreteness, that the FIG. 1 arrangement is employed to control a telephone central office, the permanent memory 10 advantageously includes, inter alia, routines for connecting a calling party to central office originating register equipment, identifying a called party from dialed information, processing signals to select a connection path between the calling and called party, and for determining whether the call originated at a pay or non-pay station. Accordingly, these routines are shown stored in the FIG. 2 replica of the composite permanent memory 10, with the first executable instructions thereof being respectively located at the storage addresses 1500, 2000, 2500 and 3000. The subdivision of the permanent memory 10 into a plurality of modules 11 is not shown in FIG. 2, with the storage locations included in the plural modules 11 being conceptually identified by consecutively-numbered memory addresses illustrated therein.

The memory 10 also includes a plurality of other stored algorithms (not shown in FIG. 2) for effecting other diverse functions associated with present-day telephony, as well as logistically oriented instruction blocks for supervising central office equipment inventory and maintenance, personnel, and the like. Further, a task assignment routine, of a nature described hereinafter, is included in the permanent memory storage locations beginning with the address 5000 shown in FIG. 2. It is noted that the last instruction in each of the routines stored in the memory 10 is a transfer to the first task assignment routine location, viz., the address 5000.

Figure 3:
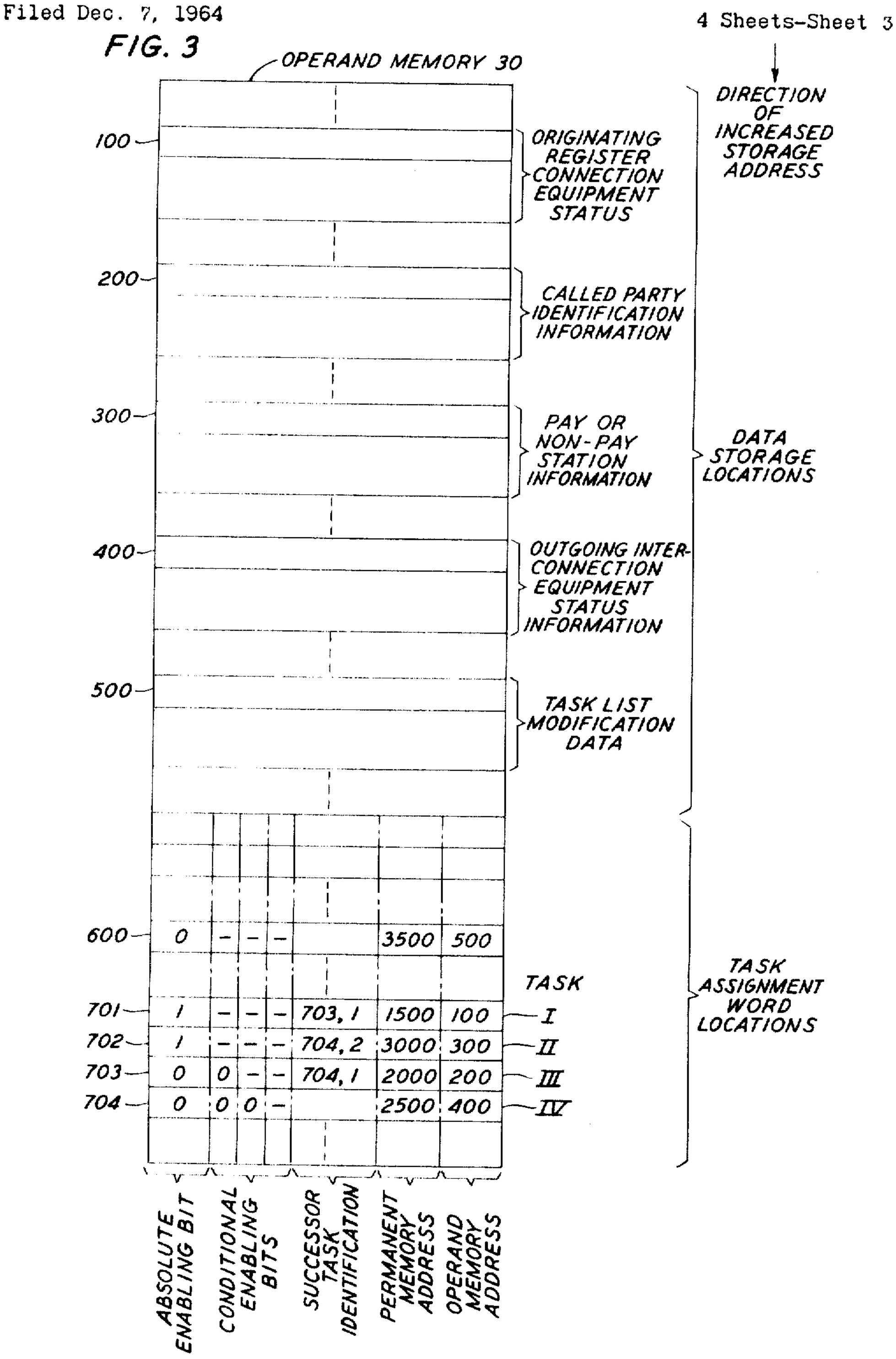
FIG. 3 is a diagram depicting the storage pattern characterizing an operand memory 30 illustrated in FIG. 1.

The digital storage pattern characterizing the composite operand memory 30 is shown in FIG. 3, and comprises data storage and task assignment word locations. The data storage locations are subdivided along functional lines, with blocks of data beginning at the storage addresses 100, 200, 300 and 400, for example, respectively embodying information relating to the status of originating register connection equipment, called party identification, pay or nonpay station classification of calling parties, and outgoing party-interconnecting equipment status.

The task assignment storage locations each comprise an absolute enabling bit, a plurality of conditional enabling bits, a successor task identifying portion, and permanent memory and operand memory address segments. The above-described task word quantization is shown in a left-to-right order for the task words depicted in FIG. 3.

Basically, the permanent memory address portion of each task assignment word specifies a task, or functional routine to be performed by a data processing unit 20 which seizes that word. Moreover, this functional routine operates on the operand data identified by the operand memory address portion thereof. The task words are stored in the memory 30 in the order of their decreasing priority of execution, as determined by the requirements of the environment controlled by the FIG. 1 real time computer, with the higher priority words being stored in the lower numbered operand storage addresses.

When a given task word requires, as a condition precedent to the execution thereof, that one or more other task words be first processed, the dependent task word includes one active conditional enabling bit for each such preceding task upon which it depends. Each of these conditional bits is initially set to a binary "0," and is rewritten into a binary "1" digit as part of the system functioning of the prior task. In addition, the absolute enabling bits included in the task words are also initially set to "0." When a word includes active conditional enabling bits, and these digits have each been set to a "1," the last executed parent task routine is operative to set the absolute enabling bit thereof to a binary "1," which condition indicates that the task word is available for processing. The above-described computing operations, as well as all other such individual programming functions attributed to the FIG. 1 embodiment, may be affected by well-known techniques therefor, such as described in a text by P. Wagner entitled "An Introduction to Symbolic Programming," published in 1963 by Charles Griffin and Company Limited, London. The absolute enabling bits of all independent task words are directly set to the "1" state by external stimulae supplied to the memory 30 by the input-output equipment 15. It is noted that all inactive conditional enabling bits, i.e., those bits which are not required to make a particular task word dependent upon the execution of another such word, are indicated by horizontal dash marks in FIG. 3.

The successor task portion of each task word identifies each of the stored assignment words dependent thereon, along with the particular conditional enabling bit included in the dependent word which is associated therewith. For example, examining the task assignment location 701 shown in the FIG. 3 replica of the memory 30, it is observed that the task word stored in location 703 depends thereon. Moreover, it is observed that the functional routine called by the assignment word stored at address 701 is operative to set the first, or left-most conditional enabling bit of the word stored at operand memory location 703 as an integral part of that algorithm.

During normal functioning of the over-all FIG. 1 digital computer, the N data processors 20 are engaged with N data blocks and N operative routines specified by a corresponding set of N task words stored in the operand memory 30. When a processor 20 completes its assigned routine, the last instruction thereof transfers control of the processor via its associated instruction location counter 22 to the task assignment algorithm beginning with the permanent store address 5000. Under control of this routine, the processor 20 sequentially searches the absolute enabling bits of the task words, starting with the highest priority such word located at the lowest numbered operand memory address, until a binary "1" is encountered.

This task assignment word so selected comprises the highest priority task word which is capable of immediate execution. Accordingly, the processor 20 reads out the full contents of the enabled task word into the processor storage unit 21, sets the absolute and conditional enabling bits thereof to "0" to assure that another processor 20 will not redundantly perform the same task, and functions to process the assigned data in the manner determined by the assigned algorithm. The above-described process is continuous, with each processor 20 being assigned a new task via the task assignment algorithm upon completion by the processor of the previously assigned system operation. Hence, regarding the specific system application under consideration, it is observed that during peak telephone traffic situations, the important, relatively high priority tasks are rapidly and repetitively executed by the data processors 20 while relatively low, logistical type functions are only performed when a processor 20 is not more urgently required for other purposes.

Where a data or task word is deemed as being critical, one of the lock-out flip-flops 51 is assigned thereto. All processors 20 desiring access to the critical operand quantity must first determine from the state of the associated flip-flop 51 whether or not the operand is available at that time, with such a determination being made in the manner described hereinabove. The lock-out control unit 50 hence inhibits a processor 20 from seizing a critical data word while it is being recomputed, or seizing a critical task word which is being examined by another processor 20 for possible execution thereof.

In addition to the above-described operative routines, the permanent store 10 further includes a task list modification algorithm which begins at storage location 3500. Correspondingly, the operand store 30 includes task list modification data, which is stored in a data block beginning with operand address 500, and also an associated task word at location 600 which includes address portions identifying the permanent and operand memory addresses 3500 and 500.

When a condition arises which is not controlled by an existing task assignment word, such as a traffic overload, system interrupt command, loss of alternating current power, or the like, or should an existing task word be no longer required when the function associated therewith is fully and finally completed, the absolute enabled bit of the task list modification word stored at operand address 600 is set to a digital "1," either directly by the input unit 18 or under program control. When this assignment word is next seized by a processor 20, the data and functional algorithm stored at operand and permanent memory locations 500 and 3500 et seq. render the processor operative to effect the appropriate corrections in the stored task assignment list. Any new tasks so established are then executed as their relative priority dictates when a processor 20 becomes available thereto. Hence, the FIG. 1 computing arrangement is exceedingly flexible in being capable of selectively generating new job functions as the need therefore arises.

The system functioning of the FIG. 1 digital computer may be more clearly understood by considering a typical computation, viz., the problem depicted in graphical form in FIG. 4A. Specifically, assume that a telephone subscriber lifts his handset off-hook to place a call. Such a request requires the steps, or tasks, of connecting the calling party to a central office originating register, determining whether a pay or nonpay station initiated the call, ascertaining the called party identification, and determining the connection route to link the parties. The four above-identified operations are respectively designated tasks I through IV, as illustrated in the task table shown in FIG. 4B.

As indicated in FIG. 4A, tasks I and II, viz., connecting the calling party to a central office originating register and determining his pay or nonpay station class of service, are independent operations which may be simultaneously performed any time after the call initiating party goes off-hook. The called party determination, corresponding to task III, may be accomplished only after task I is completed and, finally, the task IV connection route determination may be effected any time after both tasks II and III have been performed.

To effect the above-described operation, four task assignment words, corresponding to the tasks I through IV, are respectively stored in operand memory addresses 701 through 704. As seen in FIG. 3, the task I assignment word stored in operand memory location 701 includes information identifying successor task III (stored in location 703) which depends for execution thereon, and also address digit portions identifying the calling party to central office register routine beginning at permanent memory location 1500 and also the originating register equipment status data block starting at operand location 100. Similarly, examining the task IV operand address 704, note that this task assignment word includes two active conditional enabling bits, quiescently initialized to a binary "0" state, which are respectively controlled by the task II and III assignment words stored in operand locations 702 and 703. The location 704 further comprises address portions identifying the permanent memory routine relating to the calling and called party interconnection linkage pattern and the data block pertaining thereto. Correspondingly, operand locations 702 and 703 contain a similar type of digital information relating to tasks II and III associated therewith, as functionally depicted in FIGS. 4A and 4B.

Assume now, that each of the N processors 20 shown in FIG. 1 is engaged with a task distinct from the interconnection problem embodied in operand addresses 701 and 704. This engaged state is shown for the processors $\mathbf{20}_1$ and $\mathbf{20}_2$ by the cross hatching in FIG. 5 for the interval prior to a time *a* shown therein. Further, let each of the processors $\mathbf{20}_3$ through $\mathbf{20}_N$ remain so engaged for the duration of the present discussion.

At the time *a* shown in FIG. 5, assume that the telephone station under present consideration goes off-hook. At this time tasks I and II are each executable and, accordingly, the absolute enabling bits included at the corresponding operand memory address locations 701 and 702 are each switched from their initial quiescent binary "0" state to the digital "1" condition shown in FIG. 3. However, since all the processors 20 are busy at this time, no further system operation relevant to the completion of the instant call transpires.

At the time *b* shown in FIG. 5, the processor $\mathbf{20}_2$ completes its previously assigned routine and, under control of the task assignment algorithm included at permanent memory address 5000 et seq., searches for the highest priority, fully enabled task word in the operand memory 30. For present purposes, let this correspond to the task I assignment word located at address 701. Accordingly, the processor $\mathbf{20}_2$ is operative to set the absolute enabling bit of this word to "0" to inhibit any other processor 20 from seizing this storage location, and also to begin processing the originating register incoming equipment data beginning at operand location 100 in the manner specified by the central office equipment connection routine beginning at permanent memory location 1500.

At the time *c*, the processor $\mathbf{20}_1$ completes its prior operation, and is transferred by the task assignment algorithm to the operand task word at location 702. In a mode of system functioning paralleling that described above for the processor $\mathbf{20}_2$, the unit $\mathbf{20}_1$ sets the absolute enabling bit at location 702 to "0" and initiates the computation of a pay or nonpay station characterization of the calling party by operating an operand data address 300 et seq. with the instructions contained in permanent memory locations beginning with 3000.

The processor $\mathbf{20}_2$ performs task I during the interval between the times *b* and *d* shown in FIG. 5. During the latter portion of this period, and as an integral part of the task I process, the active conditional enabling bit of the task III location 703 is switched from an initial "0" to a "1." Since location 703 includes only one active conditional bit, the absolute enabling bit thereof is also set to a "1." When the first-assigned routine beginning at address 1500 is completed at the time *d* by the processor $\mathbf{20}_2$, the last instruction thereof transfers the processor to the task assignment routine beginning at permanent memory address 5000. Accordingly, at the time *d*, the task assignment algorithm assigns the processor $\mathbf{20}_2$ to the task word at operand address 703, which is the highest priority, fully enabled task word at this time. Hence, following time *d*, the processor $\mathbf{20}_2$ disables the absolute and conditional enabling bits at location 703, and initiates computation of task III.

During the time interval *c* to *e*, the processor $\mathbf{20}_1$ is engaged upon, and completes the pay or nonpay station determination, and also enables the second, or right-most active conditional enabling bit in the operand word at location 704. At the time *e*, the processor $\mathbf{20}_1$ is then transferred to the task assignment routine. Since the absolute enabling bit at operand location 704 is still in its initial, binary "0" condition at the time *e* responsive to an unenabled, left-most conditional bit, this task word is not executable at this time. Accordingly, the processor $20_1$ is assigned to a lower priority, functionally distinct task as indicated by the cross hatching following the time *e* in FIG. 5.

In the course of performing task III, the processor $20_2$ sets the first conditional enabling bit at location 704 to a "1" and, since the second such bit has previously been enabled, also sets the absolute bit to a "1." At time *f*, the processor $20_2$ completes task III, and is assigned by the task assignment algorithm to the fully enabled task IV word included at operand location 704. The processor then completes the computation for placing the desired call by determining the interconnecting linkage path.

Hence, the FIG. 1 composite digital computer has been shown by the above to rapidly and efficiently perform an arbitrarily long and complex computation by employing a plurality of digital processing units 20 to coincidently execute relatively simple component parts of the over-all problem as the processors become randomly available.

Several items should be noted at this point. First, several processors 20, operating in conjunction with task words assigned thereto, may desire access to permanent and/or operand memory locations included in the same memory module. The randomly synchronized clocks included in the processors 20 may prevent an accessing conflict from occurring since the information may not be required at precisely the same time. However, where two processors 20 coincidently desire information from the same module, the first unit to address the module will seize the switch unit 40 associated therewith to the exclusion of all other processors for the duration of the interrogation processes. The module will again become available for purposes of other processors 20 when the first request has been satisfied.

Also, when a relatively large quantity of information is to be read into or out of the operand memory 30, or a relatively large amount of input-output equipment 15 is to be controlled by the memory 30, a plurality of like input-output controlling units 18 may be employed in the FIG. 1 arrangement.

Further, it is observed that the digital content of the permanent memory 10 remains unchanged during operation of the FIG. 1 computer, while the content of the operand memory 30 is altered. Hence, the permanent memory 10 may embody a relatively inexpensive read-only storage structure such as a twistor wire and permanent magnet embodiment of the type described in D. G. Clemons Patent 3,133,271, issued May 12, 1964. Finally, note that the processors 20 are continuously engaged in performing the kernel of the computational problem of interest, and little or no time is spent in system executive programs when a new job function is assigned to a processor.

To summarize, an illustrative real time digital computer made in accordance with the principles of the present invention includes a plurality of like data processing units. The composing computer further includes permanent and temporary information memories each comprising a plurality of storage modules accessible to each data processor.

The temporary memory has a data storage area and a plurality of task assignment locations each of which includes digits identifying a storage block in each of the two computer memories, and also conditional enabling bits. The permanent memory, in turn, includes a plurality of stored functional program routines, including task assignment and task list modification algorithms.

Each of the processors independently operates on data specified by an associated task word in accordance with a routine also identified by the stored task word. Upon completion of the assigned algorithm, each processor transfers control thereof to the task assignment routine to select the highest priority, fully enabled task storage location indicative of the next task to be executed.

It is to be understood that the above-described arrangement is only illustrative of the application of the principles of the present invention. Numerous other arrangements may be devised by those skilled in the art without departing from the spirit and scope thereof. For example, two or more separate task assignment lists may be employed. If two such lists are utilized, *m* processors 20 may advantageously be assigned to one list which includes substantive tasks, while the remaining N-*m* processors are operable in conjunction with the other list for administrative purposes. In addition, the permanent and operand memories 10 and 30 may comprise different portions of the same storage arrangement.

What is claimed is:

1. In combination, first storage means for storing a plurality of functional routines, second storage means for storing digital data words and task assignment digital words, said task assignment words including a data word address portion and a functional routine address portion, a plurality of substantially identical data processors, and means for enabling each of said processors in accordance with a different one of said task assignment words for operating on the digital data identified by said task word in the manner determined by the routine identified by said task word.

2. A combination as in claim 1 further comprising means for assigning a new task word to each of said processors upon the completion by said processor of the routine previously assigned thereto.

3. A combination as in claim 2 wherein said second storage means includes means associated with each task assignment word for storing a successor task identifying information.

4. A combination as in claim 3 wherein said second storage means includes means associated with each task assignment word for storing a plurality of conditional enabling bits and for also storing an absolute enabling bit whose binary state depends upon said associated conditional enabling bits.

5. A combination as in claim 2 further including task list modification means for selectively adding to and deleting from said task assignment words included in said second storage means.

6. A combination as in claim 5 further including lockout means for selectively inhibiting said processors from interrogating the information stored at particular storage addresses included in said second storage means.

7. In combination, a plurality of data processing units each including an arithmetic unit, an instruction location counter, and randomly synchronized clock means; digital storage means accessible to each of said processing units; and means connecting each of said processing units to said storage means.

8. In combination, a plurality of substantially identical processing units, first and second digital storage means accessible to each of said processing units, said first storage means comprising a read-only embodiment, and means connecting each of said processing units to each of said storage means.

9. A combination as in claim 8 wherein said second storage means comprises a read-write embodiment.

10. A combination as in claim 8 wherein each of said processing units includes an arithmetic unit and an instruction location counter.

11. A combination as in claim 10 wherein each of said processing units further comprises clock means, said clock means included in distinct processors being randomly synchronized.

12. In combination, storage means for storing a plurality of functional routines, digital data words and task assignment words, said task assignment words including a data word address portion and a functional routine address portion, a plurality of substantially identical data processors, and means for enabling each of said processors in accordance with a different one of said task assignment words for operating on the digital data identified by said task word in the manner determined by the routine identified by said task word.

13. A combination as in claim 12 further comprising means for assigning a new task word to each of said processors upon the completion by said processor of the routine previously assigned thereto.

14. A combination as in claim 13 wherein said storage means includes means associated with each task assignment word for storing a successor task identifying information.

15. A combination as in claim 14 wherein said storage means includes means associated with each task assignment word for storing a plurality of conditional enabling bits and for also storing an absolute enabling bit whose binary state depends upon said associated conditional enabling bits.

16. A combination as in claim 12 further including task list modification means for selectively adding to and deleting from said task assignment words included in said second storage means.

17. A combination as in claim 16 further including lock-out means for selectively inhibiting said processors from interrogating the information stored at particular storage addresses included in said second storage means.

References Cited

UNITED STATES PATENTS

| | | | |
|---|---|---|---|
| 3,200,380 | 8/1965 | MacDonald ------- | 340—172.5 |
| 3,229,260 | 1/1966 | Falkoff ----------- | 340—172.5 |

ROBERT C. BAILEY, *Primary Examiner.*

R. B. ZACHE, *Assistant Examiner.*